United States Patent Office 3,216,541
Patented Nov. 9, 1965

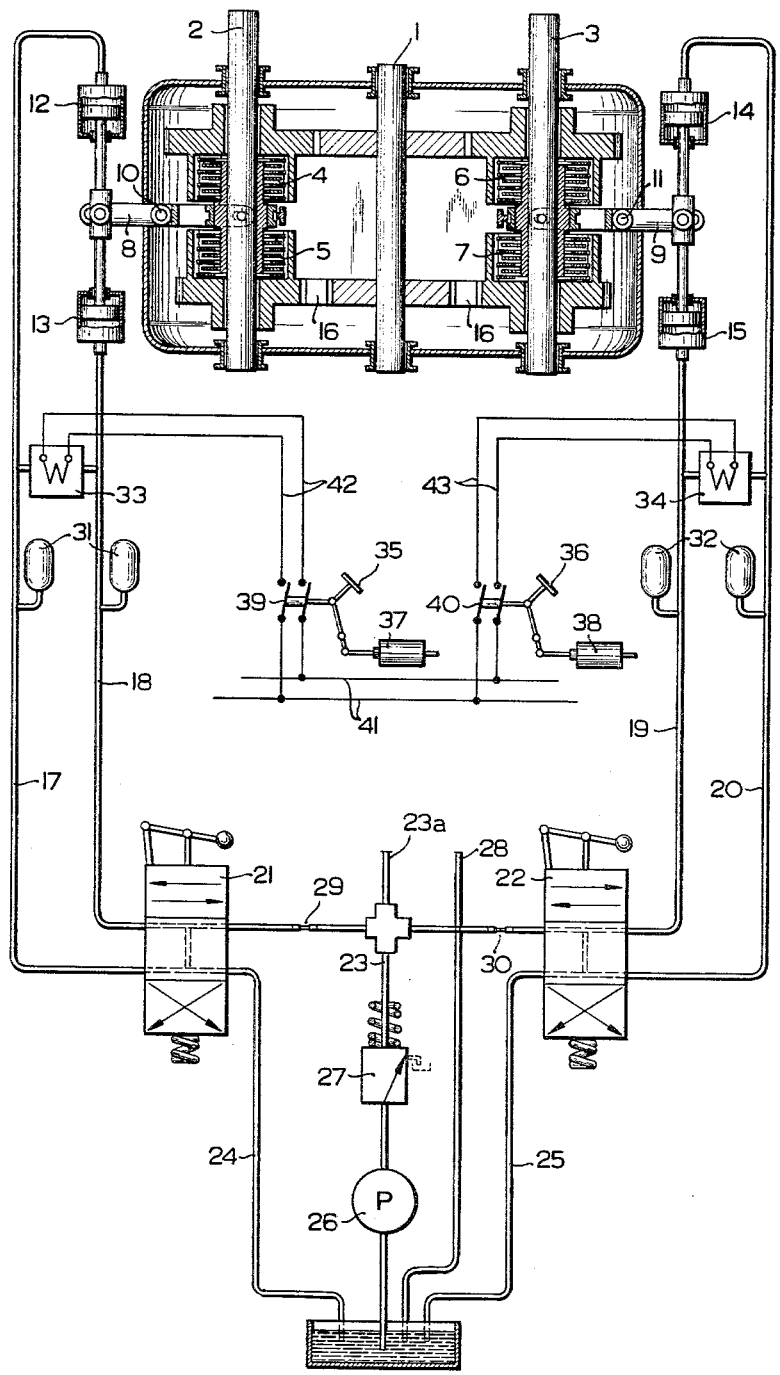

---

3,216,541
CONTROL SYSTEM FOR OPERATING THE DRIVE CLUTCHES OF MOTOR VEHICLES
Egon Steffen, Saar, Germany, assignor to Saarbergtechnik G.m.b.H., Saar, Germany
Filed Dec. 17, 1962, Ser. No. 245,121
Claims priority, application Germany, Dec. 18, 1961, S 77,167
3 Claims. (Cl. 192—12)

This invention relates to a control system for the forward and reverse drives in endless track vehicles, and more particularly to auxiliary control means responsive to the actuation of the brake pedals to disconnect the drive clutches.

The present invention is described herein particularly as applied to loading shovels of the endless track type in which the control elements are operated hydraulically.

However, the invention is suitable for other types of endless track vehicles, and it is understood that the control elements may also be actuated by pneumatic or other means. It is known that track vehicles are provided with a brake pedal or a hand lever for each track to shift the drives in order to produce a change in direction, the actuation of the foot brake or hand lever releasing a clutch before the brake makes contact so that the power flow to the track may be slowed or stopped is interrupted. Furthermore, it is possible to shift the drive of one track into the forward position and that of the other track into the reverse position so that the vehicle turns on the spot.

According to this invention a control arrangement is provided which incorporates simple but effective and dependable auxiliary means which disconnect the clutch of the endless track drive upon actuation of the associated brake pedal before and, if desired, as long as the brake is applied. Accordingly each of the two pairs of conduits which lead from the manually operated main control valves to the actuating elements of the drives may be released through an auxiliary valve which short circuits or by-passes the main control valve and which is actuated in response to a pressure on the brake pedal.

The control system of this invention facilitates substantially the operation of an endless track vehicle, especially a loading vehicle, as the driver has both hands free to operate the levers for controlling the loading shovel, a leveling plate or other earth handling implement because, except for changing direction or altering the speed, all the starting and stopping operation may be executed through the brake pedal. This may be carried out in a particularly well proportioned and sensitive manner in the case where the drive has gears which are in constant mesh and are shifted by means of two change-over clutches.

The quick release of the clutches while they are engaged for the forward or rearward movement by closing the fluid supply lines through an auxiliary control valve makes it also possible to relieve an overloaded engine which is in danger of being choked by quickly pressing down both brake pedals in order to interrupt the movement of the vehicle. The engine has time to pick up momentum and its entire output power may be employed, for example to lift the loading shovel, without requiring the manipulation of the hand levers. This type of procedure is particularly helpful in advancing the loader into a pile of material in which case the resistance to the advancing movement of the vehicle makes it frequently impossible to operate the shovel simultaneously because the engine has no longer sufficient reserve power to drive the fluid pump.

It is therefore an object of the present invention to provide a control system for operating motor vehicles and particularly endless track vehicles which allows a quick disconnection of the drive clutches.

Further objects and advantages of the control system of this invention will become apparent from the following description when read in conjunction with the accompanying drawing in which an embodiment of the invention is shown by way of example only and in which the single figure is a plan view of the control system of the invention as applied to the clutches of the driven gears of an endless track vehicle.

The drive system of the motor vehicle which incorporates the two drives for each track comprises a central drive shaft 1, a driven shaft 2, for the left track and a driven shaft 3 for the right track. Change-over clutches 4 and 5 are mounted on driven shaft 2 while change-over clutches 6 and 7 are mounted on driven shaft 3. The clutches are connected and disconnected by means of hydraulically actuated shifting forks 8 and 9. The power to produce the pivoting movements of the shifting forks around the journals 10 and 11 of the corresponding clutches is obtained by means of a pair of oppositely rotating servo-motors 12 and 13 associated with driven shaft 2 and a pair of servo-motors 14 and 15 for driven shaft 3.

The gears of the drive system are constantly in mesh and depending on which clutch or clutches are engaged either one or the other, or both driven shafts 2 and 3 are rotated in the one or the other direction. In order to change direction, for example, when the clutches 5 or 7 are engaged, intermediate gears 16 are connected in line with the regular gears mounted on shafts 1, 2 and 3, the intermediate gears being mounted outside the axial plane of the other gears. From the servo-motors 12 and 13 a pair of conduits 17, 18 lead to a hand operated control valve 21 and from the servo-motors 14 and 15 a pair of fluid conduits 19 and 20 lead to the hand operated control valve 22. Each of the control valves 21 and 22 has three shifting positions and is connected at the input side to fluid pressure conduit 23 and to return flow conduits 24 and 25 respectively. The pressurized oil is fed through a constantly rotating pump 26 over a pressure regulator 27 into the pressure conduit 23 and is returned through conduits 24 and 25 in the case where the control valves 21 and 22 are placed in the central position. A branch conduit 23a of the pressure conduit 23 is also shown in the drawing and leads together with a return flow conduit 28 to servo-motors of the drive which produces a speed change or to its control valve.

In the two other shifting positions of the two control valves 21 and 22 one of the servo-motors of the oppositely acting pair of these motors is actuated by pressurized oil while the other motor is connected to the return flow conduit. Volume control valves 29 and 30 divide the oil flow into equal parts when the two valves are open and equalizing vessels 31 and 32 disposed parallel to the pairs of conduits 17, 18 and 19, 20 are capable of absorbing the shifting jolt. The type of hydraulic control just mentioned is known in the prior art.

According to the present invention the conduits 17 and 18 of the one pair of servo-motors and the conduits 19 and 20 of the other pair of servo-motors pertaining each to a vehicle track may be short-circuited by means of electro-magnetically operated valves 33 and 34 respectively which are preferably adapted to provide a seal in both their conduits. These auxiliary valves may be actuated automatically by electric impulses which are generated when the brake pedals 35 and 36 provided each for one track are pressed down. Before the brake pedals carry out the braking process through the brake control devices 37 and 38 respectively the switches 39 and 40 whose poles are connected to an auxiliary voltage source 41, are closed and thereby close a circuit 42 and 43 respectively to actuate the corresponding magnetic valves 33 and 34. If for example the servo-motors 12 and 14 are actuated so that clutches 4 and 6 are engaged and both tracks move in the same direction, for example move forward, the clutches are released immediately when the brake pedals are pressed down, the switches 39 and 40 being closed so that the magnetically operated valves 33 and 34 are opened whereby the two pairs of fluid conduits are short-circuited so as to bypass the servo-motors. This produces the same result as if the control valves 21 or 22 would be shifted to the central or neutral position as mentioned above. When the pedals are released the switches 39 and 40 are opened so that the position and corresponding clutching action which had been previously selected by a relative positioning of the hand control valve, is reestablished.

From the aforementioned operation of the control arrangement of this invention it may be observed that the control valves 21 and 22 are operated to preselect the direction of movement of the tracks and that the signals for starting and stopping may be carried out entirely by means of the brake pedals. Aside from the special situation of making a turn on the spot for which both shifting knobs on the control valve must be manipulated at the same time and placed into oppositely directed end positions, a pre-setting may be carried out while pressing the brake pedals down slightly and shifting the control valve handles together in the same direction. It is therefore within the scope of the invention to arrange according to a further development the knobs of both hand levers of the control valves for the forward and rearward movement of each track drive for the same shifting position within the reach of one hand closely adjacent each other.

What is claimed is:

1. A control system for selectively operating the change-over clutches of rotatable shaft means comprising a fluid reservoir, first valve means connected to said fluid reservoir, means for feeding fluid from said fluid reservoir under pressure to said first valve means, fluid actuated motor means operatively connected to said change-over clutches, conduit means for connecting said first valve means to said fluid actuated motor means, said first valve means being operable to pass fluid from said reservoir selectively to said motor means, second valve means connected to said conduit means and adapted to interrupt the flow of pressurized fluid to said motor means, brake control means connected to said second valve means, and means for actuating said second valve means in response to the operation of said brake control means.

2. A control system for selectively operating the change-over clutches of rotatable shaft means comprising a fluid reservoir, first valve means connected to said fluid reservoir, first conduit means for conducting fluid from said reservoir to said first valve means, pump means connected to said first conduit means for feeding pressurized fluid to said first valve means, fluid operated motor means connected to said change-over clutches, second conduit means for conducting fluid from said first valve means to said fluid motor means, said first valve means being operable to pass pressurized fluid selectively through said second conduit means to said fluid motor means, second valve means in said second conduit means and adapted to interrupt the flow of pressurized fluid to said fluid motor means, brake control means connected to said second valve means, and actuating means for said second valve means connected to said brake control means for automatically actuating said valve means in response to the operation of said brake control means.

3. A control system for selectively operating two pairs of change-over clutches connected to a rotatable shaft means comprising a fluid reservoir, a pair of fluid operated motors connected to each said pair of change-over clutches, a main control valve for each pair of fluid operated motors and connected to said fluid reservoir, a fluid pressure line for connecting said fluid reservoir to said main control valves, a fluid pressure pump in said fluid pressure line, a fluid pressure regulator in said fluid pressure line downstream of said fluid pressure pump, a pair of fluid supply lines for connecting said main control valves to each pair of fluid operated motors, said main control valves being operable to feed pressurized fluid selectively through one of said supply lines to one of said fluid motors, a fluid return line for connecting said main control valves to said fluid reservoir, an auxiliary control valve connected to each pair of fluid supply lines, electro-magnetically operable valve closing means in said auxiliary control valves to interrupt the flow of pressurized fluid to said fluid motors, an electric circuit connected to said electro-magnetically operable valve closing means, a switch for opening and closing said electric circuit, and a brake pedal operatively connected to said switch for closing said circuit to actuate said electromagnetically operable valve closing means.

References Cited by the Examiner

UNITED STATES PATENTS

| | | | |
|---|---|---|---|
| 2,990,925 | 7/61 | Bernotas | 192—13 |
| 3,080,026 | 3/63 | Koch | 192—13 |

DON A. WAITE, *Primary Examiner.*